United States Patent
Koch

(10) Patent No.: US 10,092,092 B2
(45) Date of Patent: Oct. 9, 2018

(54) ERGONOMICS SYSTEM FOR A WORKPLACE SYSTEM

(71) Applicant: LOGICDATA Electronic & Software Entwicklungs GmbH, Deutschlandsberg (AT)

(72) Inventor: Walter Koch, Schwanberg (AT)

(73) Assignee: LOGICDATA Electronic & Software Entwicklungs GmbH, Deutschlandsberg (AT)

(*) Notice: Subject to any disclaimer, the term of this patent is extended or adjusted under 35 U.S.C. 154(b) by 290 days.

(21) Appl. No.: 14/917,927

(22) PCT Filed: Jul. 23, 2014

(86) PCT No.: PCT/EP2014/065848
§ 371 (c)(1),
(2) Date: Mar. 9, 2016

(87) PCT Pub. No.: WO2015/032545
PCT Pub. Date: Mar. 12, 2015

(65) Prior Publication Data
US 2016/0213140 A1    Jul. 28, 2016

(30) Foreign Application Priority Data

Sep. 9, 2013 (DE) .................. 10 2013 109 830

(51) Int. Cl.
*A47B 21/02* (2006.01)
*G06F 3/01* (2006.01)
(Continued)

(52) U.S. Cl.
CPC ............ *A47B 21/02* (2013.01); *A47C 3/20* (2013.01); *G05B 15/02* (2013.01); *G06F 3/011* (2013.01); *G06F 3/0304* (2013.01)

(58) Field of Classification Search
CPC .......... A47B 21/02; A47B 3/20; G05B 15/02; G06F 3/011; G06F 3/0304
See application file for complete search history.

(56) References Cited

U.S. PATENT DOCUMENTS

| 6,964,370 B1 | 11/2005 | Hagale et al. |
| 7,439,956 B1 | 10/2008 | Albouyeh et al. |

(Continued)

FOREIGN PATENT DOCUMENTS

| DE | 10 2008 044 848 A1 | 3/2010 |
| DE | 20 2013 002 800 U1 | 7/2013 |
| WO | 2005/074754 A1 | 8/2005 |

*Primary Examiner* — Pho M Luu
(74) *Attorney, Agent, or Firm* — McDermott Will & Emery LLP

(57) ABSTRACT

An ergonomics system for a workplace system with adjustable furniture comprises a data processing device and an image recording device connected to the data processing device and arranged and designed such that image data representing an image of the workplace system user is transmitted to the data processing device. The data processing device is connected to an ergonomics database and is designed to evaluate the image data in order to determine the user's position data and posture data, to compare the determined position data and posture data to reference data in the ergonomics database in order to determine a measurement of a correctness of a corresponding position and posture of the user on the basis of the comparison, and to signal the determined measurement of correctness to the user.

15 Claims, 2 Drawing Sheets

(51) Int. Cl.
*G06F 3/03* (2006.01)
*A47C 3/20* (2006.01)
*G05B 15/02* (2006.01)

(56) References Cited

U.S. PATENT DOCUMENTS

| | | | |
|---|---|---|---|
| 9,710,508 B2 * | 7/2017 | Rice | G06F 17/30348 |
| 2001/0000300 A1 * | 4/2001 | Haile-mariam | F16M 11/046 |
| | | | 353/30 |
| 2002/0010679 A1 | 1/2002 | Felsher | |
| 2009/0150006 A1 | 6/2009 | Albouyeh et al. | |
| 2009/0273441 A1 | 11/2009 | Mukherjee | |
| 2011/0080290 A1 | 4/2011 | Baxi et al. | |
| 2013/0012802 A1 | 1/2013 | Horseman | |
| 2013/0110004 A1 | 5/2013 | McLane et al. | |
| 2013/0199420 A1 * | 8/2013 | Hjelm | A47B 21/00 |
| | | | 108/20 |
| 2014/0006060 A1 * | 1/2014 | Sehnal | G06Q 10/0631 |
| | | | 705/4 |

* cited by examiner

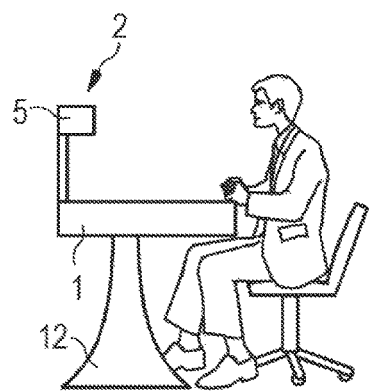
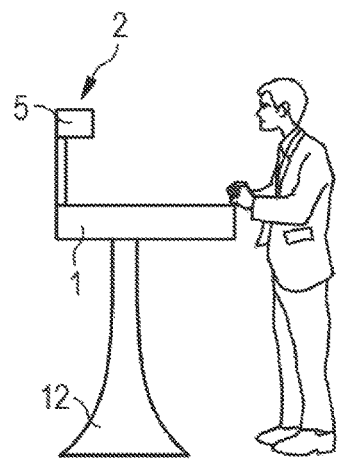
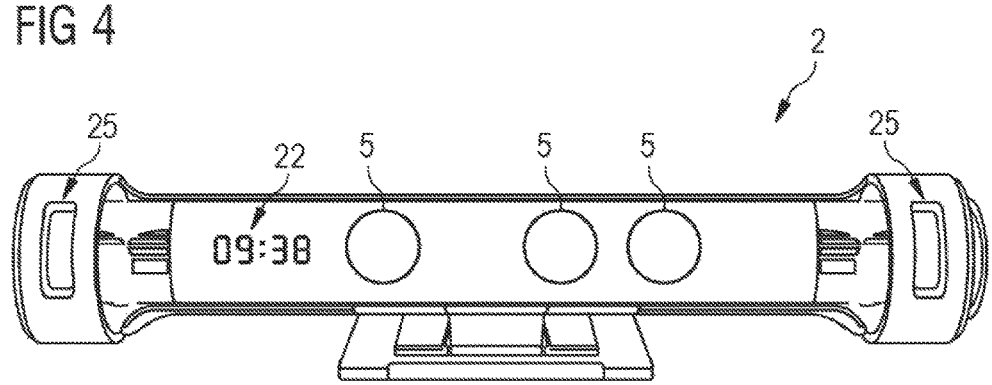

ERGONOMICS SYSTEM FOR A WORKPLACE SYSTEM

The invention relates to an ergonomics system for a workplace system with an adjustable desk.

BACKGROUND OF THE INVENTION

It is becoming more and more important to operators of workplaces, particularly in the office field, to pay attention to the ergonomic use of the workplaces. Most users are of course aware in general that they should be attentive to an ergonomic furnishing of the workplace and to an appropriate position and posture of the user, but this is seldom consistently applied in practice. For example, this may be due to the fact that the users themselves pay too little attention to ergonomic working conditions. Moreover, users of workplace systems often lack precise information about how such ergonomic working conditions can be created.

In addition, a great number of adjustment possibilities are provided in modern office furniture. For example, desks are available for which a height adjustment of the desk by means of the desk frame is possible, manually or using motors. Such motors are often driven by a corresponding controller, which usually has operating elements accessible to a user. In other cases, an adjustable desk is designed such that the desktop is adjustable not only in height, but also with respect to its angle. Ergonomic needs of a user can be satisfied with these adjustment possibilities.

Due to the complexity however, many users are not capable of using the multiple adjustment possibilities ergonomically correctly.

SUMMARY OF THE INVENTION

The flexible concept for an ergonomics system is based on the idea of recording and evaluating current ergonomic parameters for a user of a workplace system. According to the flexible concept, position data and posture data for the user are detected from image data that is recorded by an image recording device. By comparing current data from the user to reference data that is stored in an ergonomics database, for example, the user can be given feedback about the ergonomic quality of his posture and/or position. The user can be prompted to change his position and/or posture, which can again be detected. Thus a change to an ergonomically correct position or posture can also be signaled to the user.

A workplace system is understood to be a system in the form of machines, tools, equipment or other objects with which a person is involved or comes into contact with during work or other activities. A typical example of such a workplace system is an office workplace in which a sitting or standing activity is performed at an adjustable piece of furniture. Such furniture includes, for example, a desk, a chair and or a video screen display or other adjustable elements. These elements are not only height-adjustable, but can also be designed to be tilted if needed.

Signaling to the user makes it possible for the user not only to obtain feedback on possibly incorrect ergonomic posture or positioning, but also feedback on a correct modification. The user is thereby continually prompted to behave ergonomically. Thus, one could say that, by utilizing the image recording device and the image data with appropriate evaluation and feedback to the user, an ergonomic control loop with the user is closed. Workplace ergonomics is therefore increased by direct feedback to the user.

In one embodiment example, an ergonomics system according to the flexible concept comprises a data processing device and an image recording device connected to the data processing device and arranged and designed such that image data representing an image of a workplace system user is transmitted to the data processing device. The data processing device is connected to an ergonomics database. Additionally, the data processing device is designed to evaluate the image data and to determine personal data, particularly position data and posture data and/or other data such as the weight of the user as determined by a sensor, and to compare the acquired personal data to reference data in the economic database in order to determine a measure for a correctness of the corresponding position and posture of the user. The determined measure of correctness is signaled to the user by the data processing device.

In one configuration, the data processing device is designed to signal the determined measure of correctness in at least three levels. These three levels correspond, for example, to a high level of correctness, a medium level of correctness, and a low level of correctness, or complete incorrectness. In the simplest case, the signaling can be done via LEDs, such as colored LEDs. A high level of correctness can be signaled with a green LED, a medium level correctness with a yellow LED and a low correctness or complete incorrectness with a red LED. The correctness can also be signaled by means of a representation on the display of an electronic device, e.g. a properly set up mobile telephone or a computer such as a tablet computer.

The image recording device preferably comprises a digital camera, for example, which further preferably has a video acquisition function in order to be able to record moving image data. Single images that are taken in defined intervals can also be used for the evaluation, however. In some embodiments, the image recording equipment also comprises multiple cameras, for example three cameras, which, among other things, allows a larger detection area. In addition, a spatial evaluation of the user's position and posture can be simplified by using multiple cameras. Using two cameras and infrared illumination is also advantageous for spatial detection of the user information.

The data processing device comprises, for example, an ordinary commercial workplace computer or a notebook computer. It is likewise possible for the data processing device to be implemented by a mobile communications device or a tablet computer.

In other embodiments, the data processing device is provided as an integrated unit with the image detection device. It can be used separately from a workplace computer. It is also possible to use a camera that is integrated into a workplace computer connected thereto as the recording device. It is likewise possible to use a tablet computer with an appropriate front camera as the data processing device with integrated image detection device.

BRIEF DESCRIPTION OF THE DRAWINGS

The invention will be explained in detail below on the basis of a number of embodiments with reference to the attached drawings. Embodiment examples are not limited to their specific representation. Individual elements of the embodiments can be combined without contradicting the basic principle of the present invention. Elements with identical effect or function also bear the same reference numbers, so that repeated explanation can be eliminated in individual cases.

In the drawings:

FIG. 3A and FIG. 3B show different examples of application of an ergonomics system with a workplace system, and FIG. 4 shows an embodiment of an ergonomics system.

DETAILED DESCRIPTION

Figure 1:
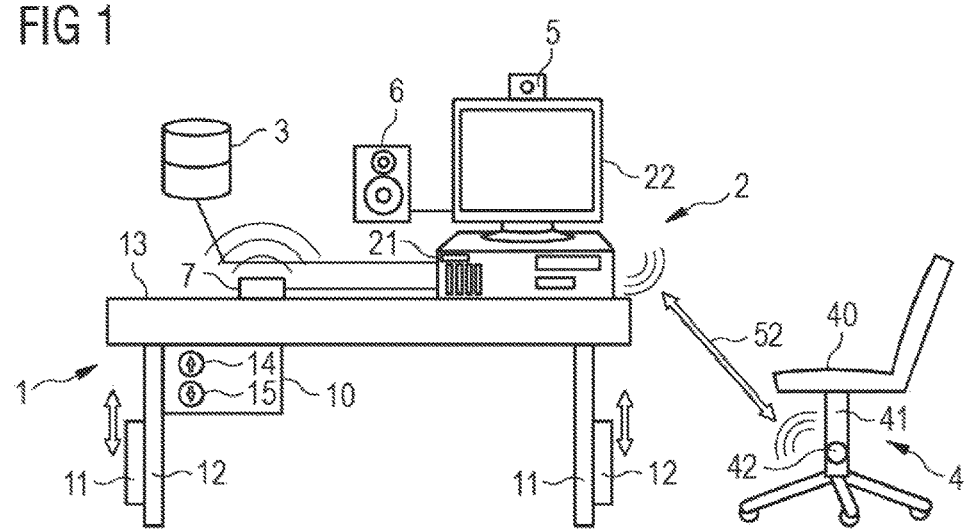
FIG. 1 shows an embodiment of an ergonomics system along with a workplace system.

FIG. 1 shows an embodiment of an ergonomics system along with a workplace system. A desk 1, a data processing device 2, a database 3, a chair 4, an image recording device 5, audio means 6, and an identification device 7 are shown there. The desk 1 has a frame 12 with electric motors 11, via which a height adjustment of a desktop 13 is possible. The desk 1 also has a controller 10, in which operating elements 14, 15 are arranged. The controller is coupled via a connection, not shown here, to the motors 11 in order to actuate them. The controller 10 can also have a data connection to a workplace computer 21 of the data processing device 2. The desk 1 and the chair 4 as well as the respective associated elements such as the controller 10 are associated with the workplace system.

In addition to the workplace computer 21, the data processing device 2 comprises a display device 22, which is implemented as a standard monitor of the PC workplace system, for example. The chair 4 is shown as a conventional office chair with a central column 41 and an adjustable seat surface 40 supported by the column 41. The backrest is also tiltable or has a variable inclination. The chair 4 can also have a weight sensor 42 that is installed in the central column. The optional weight sensor 42 has a wireless interface 52, via which data can be exchanged with the data processing device 2.

The weight sensor 42 of the chair 4 preferably comprises a piezoelectric sensor, which converts forces acting thereon, weight forces in this case, into an electrical voltage according to the piezoelectric principle. A sensor that operates with elongation measuring strips can alternatively be used. The weight sensor 42 can also be integrated into the seat surface 40, for example. The weight data generated with the weight sensor 42 can be transmitted to the data processing device via a wireless interface 52. The wireless interface 52 is preferably implemented as a Bluetooth interface.

The ergonomics system comprises the data processing device 2 and the image recording device 5. The database 3, which is used as the ergonomics database, can be integrated into the ergonomics system or arranged externally. The identification device 7 and the audio means 6 can likewise be autonomous or associated with the ergonomics system. The ergonomics database 3 is preferably maintained centrally and can be accessed from the data processing device 2 via a network connection.

Adjustments of the table 1 can be made in the workplace system by actuating the operating elements 14, 15. For example, the desk can be raised by actuating the operating element 14, while it can be lowered by actuating the operating element 15. Other adjustment possibilities for the desk, with respect to the angle of the desktop to the horizontal, for example, are possible but are not shown here for reasons of clarity. The seat height of the chair 4 can also be adjusted. In summary, the adjustment possibilities of the workplace system allow provision of favorable ergonomic conditions for a user of the workplace system. This is further supported by the ergonomics system.

The image recording device 5 is designed to transmit image data representing an image of a user of the workplace system to the data processing device 2. This is supported by the arrangement of the image recording device 5. The data processing device is designed to evaluate the image data in order to determine personal data such as position data and posture data of the user. For this purpose, appropriate software is implemented in the data processing device, for example. The data processing device 2 is capable of obtaining reference data from the ergonomics database 3 and comparing it to the determined personal data, in particular the user's position data and posture data. Based on this comparison, the data processing device 2 can determine a measure of the correctness of the corresponding position and posture of the user. This determined measure of correctness is signaled to the user by the data processing device 2, using the display device 22 for example.

Thereby the user is directly presented with an indication of whether and to what extent he is working ergonomically correctly in the workplace system. Due to this feedback from the ergonomics system, he can adjust his position and posture if necessary, which is in turn determined by the ergonomics system. For example, an incorrect posture and position is indicated to the user until he has assumed a completely correct posture and position.

The measure of correctness can be signaled in at least three levels, in which the user is signaled, for example, that he has a high, medium or unsatisfactory correctness with regard to ergonomics, or is completely incorrect. This can be achieved with a bar graph code or a color code, for example, in which green stands for a high level of correctness, yellow for a medium level of correctness and red for insufficient correctness. It goes without saying that other gradations are possible that allow the user to recognize the extent of correctness in a simple form. Such a gradated display can be performed with colored or colorable LEDs, which are not shown solely for reasons of clarity. In principle, however, a display on the video screen 22 of the data processing device 2 is also possible.

In addition to a simple feedback, the ergonomics system in different embodiments can also output recommendations to the user of how he should change his position and/or posture in order to achieve an ergonomically better posture and/or position. This can be accomplished, for example, by displaying the recommendation textually on the video screen or via a voice output system using the audio means 6. It is likewise possible to generate a graphic representation of the recommendation on the video screen, possibly with the assistance of an animated figure or avatar.

After output of the recommendation for change, it can be determined by evaluating the image data whether and to what extent the user has followed the recommendation and what changes he has undertaken. By comparison of the determined change to the change recommendation, a further feedback can be generated for the user, based for example on the comparison result.

The change recommendation can relate to the user's posture, for example a position of the shoulders, head, arms or the like that is to be changed. Such a recommendation can also include a recommendation for a change between a standing position and a sitting position of the user, the table height being adjusted correspondingly from a sitting height to a standing height. In principle, the ergonomics system is also capable of determining whether the table level for the user in their respective situation is correctly adjusted in order to provide a recommendation for an adjustment of the table height.

In addition to purely monitoring the user's ergonomic data, the ergonomics system can also be used for controlling functions of the desk 1. For this purpose, the ergonomics system, particularly the data processing device 2, is connected to the controller 10. For example, if the user changes from a standing to a sitting position or vice versa, this can be detected by the data processing device 2 by evaluating the image data, in order then to undertake a corresponding automatic or semiautomatic adjustment of the desk height with the assistance of the controller 10. For example, the desk height can be automatically adjusted if the user has assumed the new sitting or standing position over a predetermined period of time. Alternatively, there can be an adjustment in a semiautomatic operation if it is additionally signaled by the user. This can be accomplished by simple actuation of an operating button or preferably by recognition of a gesture in the image data by the data processing unit 2.

According to a similar or analogous principle, an exact adjustment of the ergonomically favorable desk height can be undertaken whenever the ergonomics system determines, for example, that an ergonomically optimal desk height could be achieved by adjustment.

The ergonomics system is optionally also designed to perform a user recognition. This can be conducted by the data processing device based on the image data. Alternatively, a user can also be recognized by an access medium, which can be implemented for example using the identification device 7. For instance, the user may have a data card or a device that is set up for near field communication, NFC. In principle, a login to the ergonomics system with username and password is also possible if necessary.

When the ergonomics system has accordingly recognized the user, personalized ergonomics data can be stored and retrieved on the basis of the user recognition. This can be accomplished in the ergonomics database 3, but alternatively in a separate storage system. The personalized ergonomics data is preferably maintained centrally, so that even if different workplaces with ergonomics systems with access to the data are used, the ergonomics can be individually adjusted. Preferably, the measure for the correctness of the user's position and posture is initially determined on the basis of the personalized ergonomics data.

In addition to user recognition, the ergonomics system can also be capable of detecting the presence of a user at the workplace system. For example, the ergonomics system can detect and signal an absence of the user, in order to undertake energy saving measures.

In various embodiments, the ergonomics system is also designed to determine and evaluate a brightness at the workplace system. For example, a light sensor that transmits brightness values to the data processing device is provided for this purpose. Alternatively or additionally, the brightness can also be determined via the image data or generally via the image recording device 5. For example, the ergonomics system can be designed to signal whether there is sufficient brightness at the workplace system, possibly again in at least three levels as previously described for correctness.

In some configurations, the ergonomics system or the data processing device 2 is designed to detect at least one factor regarding the performance capabilities of a person using the workplace system on the basis of the image data. For example, it can be detected whether the user is becoming tired, possibly on the basis of a detected body position or an evaluation of the eyes. If tiredness is detected, the user can be given an indication that he should either rest or move in order to reactivate the circulatory system, for example.

Figure 2:
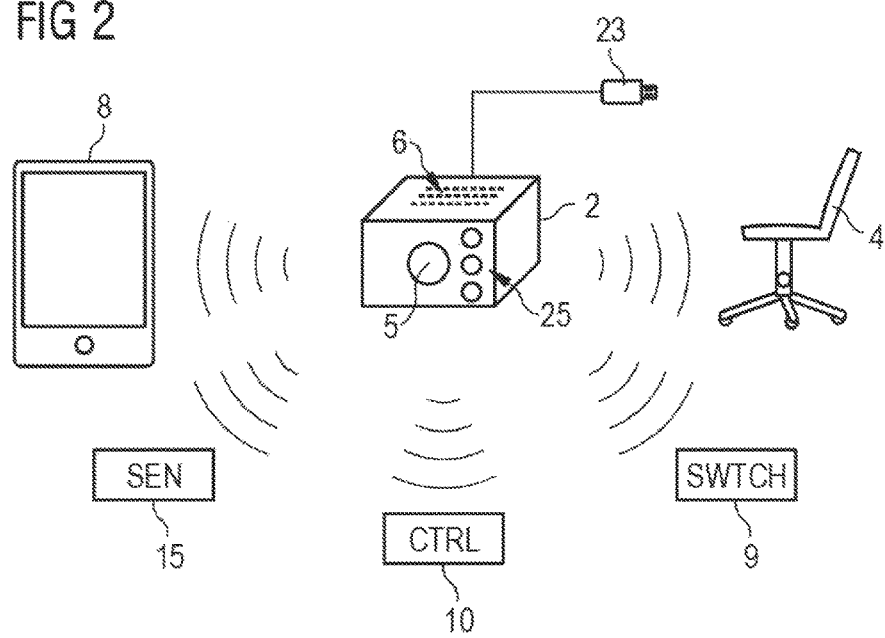
FIG. 2 shows another embodiment of an ergonomics system.

FIG. 2 shows an additional embodiment of an ergonomics system, in which the image recording device 5 is integrated into the data processing device 2. In addition, the audio means 6, such as a loudspeaker, is integrated in a housing shared with the data processing device 2 and the image recording device 5. With regard to functionality, the reader is referred to the description of FIG. 1. No desk 1 is shown in FIG. 2 for reasons of clarity.

In the embodiment of FIG. 2, the correctness is signaled via display means 25, for example, which are perhaps implemented as LEDs. Further displays can also be accomplished using a screen of a mobile telephone (smartphone) or a tablet computer 8, which is connected to the ergonomics system via a wireless connection such as a WLAN connection. The ergonomics system has a hard-wired cable connection 23, which is implemented as a USB plug, for example. With the latter, a power supply can be fed from a USB plug-in power adapter, which can also supply a rechargeable battery in the ergonomics system. A connection to a workplace computer can also be established via the plug 23.

The ergonomics system is additionally connected to the chair 4 via a wireless connection, preferably a Bluetooth connection, in order to receive weight data from the sensor 42. There are also wireless connections to a switching unit 9, to the controller 10 and to an external sensor 15.

Functions and properties of the ergonomics system, some of which are optional, that enable an ergonomic use of a workplace system will be described below. In principle, the user of the workplace system should also be kept in motion during use, so that he remains healthy. The ergonomics system can thus be used as a personal coach that provides expert ergonomics knowledge by access to the ergonomics database 3. By interaction with the user, the ergonomics system in accordance with the flexible concept addresses the personal benefit for the user.

As previously described, the ergonomics system, by evaluating the image data, enables an automatic adjustment of the desk when the user stands up and sits down. Adjustment of the desk is also possible by directly operating the controller 10, using the elements 14, 15, for example. System data and recommendations can also be displayed on a video screen 22 of a workplace computer or on a separate display such as a tablet computer 8.

In addition to the display and recommendations for correct ergonomic posture or position using the ergonomics database, the ergonomics system can also provide instructions on proper adjustment of seat height, monitor height, keyboard height, desk height, workplace lighting, etc. This data is also stored in the ergonomics database 3. Using the various display possibilities, the feedback from the ergonomics system to the user can also take place in the form of an avatar that interacts with the user. For example, the recommendations can be spoken by the avatar. The corresponding display and the voice output are generated in the data processing device 2.

The various functions can be used particularly for a personalization of the ergonomics system based on user recognition, as described above. This can be supplemented by additional sensor systems such as weight measurement or the adjustment of the seat base and seat back in the chair 4, which can enter into the ergonomic evaluation.

For example, statistics regarding the ergonomics and physical characteristics of the user can be produced by the ergonomics system. In different embodiments, the ergonomics system can also provide a training program for the user for the current day, for example. Statistical data, such as a sitting time or a standing time per time unit, can be output to the user with a corresponding feedback or recommendation. This is based on the fact that there should be a regular change between sitting and standing activity for ergonomic purposes. A possible movement analysis by evaluating the image data can also detect and display information on the user's calorie consumption or fat burning. This data can also enter into personalized statistics. Such measurements are supported by additional sensor systems such as a motion detecting wristband that transmits its detected data to the ergonomics system or the data processing device 2. The weight data for the user on the chair 4 can also be detected and displayed as a statistic.

Continuous evaluation of the user's posture or movement can also determine suitable break times, at which the user is prompted to take a break and instructed about exercises during the break. General daily fitness exercises with feedback and determination of the calorie consumption can also be provided by the ergonomics system. In addition to information about fitness exercises, the regular indication to change between a standing and a sitting position can also be output. As described above, the data processing device and the ergonomics system can also be used to determine whether the user is tired in order to provide appropriate instructions. This data can also be acquired by the statistics.

As already mentioned, the various types of feedback can be delivered by means of a so-called avatar. The avatar can also greet the user when he reaches the workplace system and thus achieves a higher efficiency in motivating the user to follow recommendations for ergonomics. Acoustic feedback can preferably be designed such that an acoustic output can optionally be shut off when used in cubicle offices. In this case, the output is accomplished as text, by symbols, by vibration or via the display in the wristband or on the video screen of a wristband computer.

An ergonomics system according to the flexible concept makes it possible to arouse the play instinct in people by making a numerical evaluation, which is communicated to others in the network, particularly in the Internet. This makes it possible to achieve various levels, which may correspond to models in sports, comics or Hollywood actors. The ergonomics system can arouse interest in the importance of movement in the workplace by displaying health and fitness studies from a wide variety of places. A motivation can be accomplished by giving the user direct positive feedback or support in real time after outputting recommendations and instructions.

Due to the centrally set-up structure of the ergonomics system, particularly the central provision of the ergonomics database 3, the personal ergonomics data can also be transported between different workplaces, so that an optimal ergonomic adjustment can be used even when other identically constructed workplaces are used. As previously described, this is accomplished by the optional user recognition. If the personalized ergonomics data is not centrally stored, it can be stored by a data card for example, that identifies the user. Even if the user recognition is implemented by means of NFC, the personalized ergonomics data can be stored in the corresponding NFC device.

As additional information, the ergonomics system can also provide support in the use of the workplace system, as a type of interactive user manual.

The ergonomics system can also be used to acquire statistical data and/or operating data for the workplace system and evaluate it centrally. For example, it is also possible in this manner to implement energy saving functions such as automatically switching off lights and monitors or other power consumers when the user is not present at the workplace, which can be recognized by the ergonomics system. Unused power consumers can be shut down by the wirelessly connected switching unit 9, which may have switchable outlets or the like.

Various usage positions of a workplace system are illustrated in FIGS. 3A and 3B. For example, the desk 1 in FIG. 3A is in a low position, in which the user is sitting at the desk 1. This is detected by the ergonomics system.

In a similar manner, the standing position of the user as shown in FIG. 3B is also detected by the ergonomics system. The ergonomics system is preferably capable of determining the proper desk height or desk position in each situation and adjusting it with the aid of the controller 10. In addition, an automatic adjustment of the desk, e.g. with respect to height, can be initiated by the basic determination of whether the user is sitting or standing.

FIG. 4 shows an example of implementation of the ergonomics system, in which the data processing device 2 and the image detection device 5 are integrated in a common housing. A display device 22 as well as display devices 25 arranged on the left and right are also provided in the housing.

In the illustrated embodiment, the image recording device 5 has multiple cameras, in particular three, each delivering image data from which spatial properties can be better derived. It is also proposed to employ two cameras for the spatial image acquisition and to arrange infrared lighting in the third space or circular hole in order to obtain better spatial detection by means of the reflected light. The display device 22 can be implemented as a small video screen but also as a dot matrix display with limited resolution but simplified control. Various data can be represented using the display device 22, such as the time of day in this example. Text or symbols that signal the necessary actions to the user can also be called up for necessary recommendations to the user. A greeting to the user can also be displayed.

The gradated correctness data can be signaled using the display device 25, which is implemented with LEDs or a video screen display, for example.

The ergonomics system in the illustrated form can be connected to a workplace computer via a cable connection or a wireless connection. A connection to a tablet computer 8 or a different type of electronic computer, which offers a further display possibility, can also be established. For this purpose, a corresponding application is installed on the tablet computer 8 or the device. With respect to possible connections, the reader is also referred to the explanations for FIG. 2.

The ergonomics system illustrated in FIG. 4 can be positioned in a variety of manners at a workplace, particularly with a workplace computer. For example, the ergonomics system can be mounted on a monitor base, using a bracket above the monitor, or separately.

The various embodiments of the ergonomics system as described above have the effect of continually prompting the user to behave ergonomically. Thus one could say that, by utilizing the image recording device and the image data with appropriate evaluation and feedback to the user, an ergonomic control loop with the user is closed. Workplace ergonomics can therefore be increased by direct feedback to the user.

The invention claimed is:

1. An ergonomics system for a workplace system with an adjustable desk and a controller that is arranged at the desk and is designed to adjust a height of the desk, the ergonomics system comprising a data processing device and an image recording device connected to the data processing device that is arranged and designed such that image data representing an image of the workplace system user is transmitted to the data processing device, wherein the data processing device is connected to an ergonomics database and is designed:
- to evaluate the image data in order to determine position data and posture data of the user;
- to compare the determined position data and posture data to reference data in the ergonomics database in order to determine a measurement of an ergonomic correctness of the corresponding position and posture of the user on the basis of the comparison;
- to signal the determined measurement to the user;
- to evaluate the image data in order to detect a change between a standing position and a sitting position of the user; and
- to trigger the controller for a corresponding adjustment of the height of the desk in case of a detected change.

2. The ergonomics system according to claim 1, in which the data processing device is designed to signal the determined measurement of correctness in at least three levels, in particular corresponding to a high degree of correctness, a medium degree of correctness or no correctness at all.

3. An ergonomics system for a workplace system with an adjustable desk and a controller that is arranged at the desk and is designed to adjust a height of the desk, the ergonomics system comprising a data processing device and an image recording device connected to the data processing device that is arranged and designed such that image data representing an image of the workplace system user is transmitted to the data processing device, wherein the data processing device is connected to an ergonomics database and is designed:
- to evaluate the image data in order to determine position data and posture data of the user;
- to compare the determined position data and posture data to reference data in the ergonomics database in order to determine a measurement of an ergonomic correctness of the corresponding position and posture of the user on the basis of the comparison; and
- to signal the determined measurement to the user,
- wherein the image recording device comprises a digital camera, in particular with a video acquisition function.

4. An ergonomics system for a workplace system with an adjustable desk and a controller that is arranged at the desk and is designed to adjust a height of the desk, the ergonomics system comprising a data processing device and an image recording device connected to the data processing device that is arranged and designed such that image data representing an image of the workplace system user is transmitted to the data processing device, wherein the data processing device is connected to an ergonomics database and is designed:
- to evaluate the image data in order to determine position data and posture data of the user;
- to compare the determined position data and posture data to reference data in the ergonomics database in order to determine a measurement of an ergonomic correctness of the corresponding position and posture of the user on the basis of the comparison;
- to signal the determined measurement to the user; and
- to perform a user recognition on the basis of the image data and to store and recall personalized ergonomics data on the basis of the user recognition.

5. The ergonomics system according to claim 4, in which the data processing device is designed to determine the measurement for the correctness additionally on the basis of the personalized ergonomics data, in particular position, posture and weight of the user.

6. An ergonomics system for a workplace system with an adjustable desk and a controller that is arranged at the desk and is designed to adjust a height of the desk, the ergonomics system comprising a data processing device and an image recording device connected to the data processing device that is arranged and designed such that image data representing an image of the workplace system user is transmitted to the data processing device, wherein the data processing device is connected to an ergonomics database and is designed:
- to evaluate the image data in order to determine position data and posture data of the user;
- to compare the determined position data and posture data to reference data in the ergonomics database in order to determine a measurement of an ergonomic correctness of the corresponding position and posture of the user on the basis of the comparison;
- to signal the determined measurement to the user; and
- to perform a user recognition via an access medium, particularly a data card or a near field communication, NFC, and to store and recall personalized ergonomics data on the basis of the user recognition.

7. An ergonomics system for a workplace system with an adjustable desk and a controller that is arranged at the desk and is designed to adjust a height of the desk, the ergonomics system comprising a data processing device and an image recording device connected to the data processing device that is arranged and designed such that image data representing an image of the workplace system user is transmitted to the data processing device, wherein the data processing device is connected to an ergonomics database and is designed:
- to evaluate the image data in order to determine position data and posture data of the user;
- to compare the determined position data and posture data to reference data in the ergonomics database in order to determine a measurement of an ergonomic correctness of the corresponding position and posture of the user on the basis of the comparison;
- to signal the determined measurement to the user; and
- to output a recommendation for a change of the user's position and posture on the basis of the comparison to the reference data.

8. The ergonomics system according to claim 7, in which the data processing device is connected to a video screen and is designed to generate a graphic representation of the recommendation on the video screen.

9. The ergonomics system according to claim 7, in which the data processing device is connected to audio means and is designed to generate a voice output corresponding to the recommendation and to output it via the audio means.

10. The ergonomics system according to claim 7, in which the data processing device is designed to detect an actual change of the user's position data and posture data, to compare the actual change to the output recommendation for the change and to output a comparison result corresponding thereto.

11. The ergonomics system according to claim 7, that is provided for a workplace system with an adjustable furniture piece, particularly a desk, a chair and/or a display device, wherein the recommendation comprises a recommendation for a change between at least two positions of the user with corresponding adjustment of the furniture.

12. The ergonomics system according to claim 7, in which the data processing device is designed to determine a measurement of a brightness at the workplace system and to signal the determined brightness measurement to the user.

13. The ergonomics system according to claim 7, in which the data processing device is designed to detect at least one factor regarding the performance capabilities of a workplace system user on the basis of the image data.

14. An ergonomics system for a workplace system with an adjustable desk and a controller that is arranged at the desk and is designed to adjust a height of the desk, the ergonomics system comprising a data processing device and an image recording device connected to the data processing device that is arranged and designed such that image data representing an image of the workplace system user is transmitted to the data processing device, wherein the data processing device is connected to an ergonomics database and is designed:
   to evaluate the image data in order to determine position data and posture data of the user;
   to compare the determined position data and posture data to reference data in the ergonomics database in order to determine a measurement of an ergonomic correctness of the corresponding position and posture of the user on the basis of the comparison;
   to signal the determined measurement to the user; and
   to determine a suitable desk height on the basis of the comparison to the reference data and to trigger the controller for a corresponding adjustment of the height of the desk to the suitable desk height.

15. An ergonomics system for a workplace system with an adjustable desk and a controller that is arranged at the desk and is designed to adjust a height of the desk, the ergonomics system comprising a data processing device and an image recording device connected to the data processing device that is arranged and designed such that image data representing an image of the workplace system user is transmitted to the data processing device, wherein the data processing device is connected to an ergonomics database and is designed:
   to evaluate the image data in order to determine position data and posture data of the user;
   to compare the determined position data and posture data to reference data in the ergonomics database in order to determine a measurement of an ergonomic correctness of the corresponding position and posture of the user on the basis of the comparison;
   to signal the determined measurement to the user; and
   to detect a presence of a user of the workplace system.

* * * * *